United States Patent [19]
Watanabe et al.

[11] Patent Number: 5,206,620
[45] Date of Patent: Apr. 27, 1993

[54] SINTERED FERRITE BODY, CHIP INDUCTOR, AND COMPOSITE LC PART

[75] Inventors: Hideo Watanabe, Chiba; Yoichi Kanagawa, Tokyo; Takashi Suzuki, Ichikawa; Takeshi Nomura, Matsudo, all of Japan

[73] Assignee: TDK Corporation, Tokyo, Japan

[21] Appl. No.: 539,600

[22] Filed: Jun. 18, 1990

Related U.S. Application Data

[62] Division of Ser. No. 213,225, Jun. 29, 1988, Pat. No. 4,956,114.

[30] Foreign Application Priority Data

| Jul. 1, 1987 | [JP] | Japan | 62-164961 |
| Jul. 1, 1987 | [JP] | Japan | 62-164962 |
| Nov. 16, 1987 | [JP] | Japan | 62-289095 |

[51] Int. Cl.⁵ .............. H01F 15/04; C04B 35/26; H05K 7/00
[52] U.S. Cl. .............. 336/84 M; 252/62.58; 252/62.56; 252/62.62; 361/292
[58] Field of Search ......... 252/62.58, 62.6, 62.62; 501/32; 361/331, 380, 392; 336/65, 67, 84 M

[56] References Cited
FOREIGN PATENT DOCUMENTS
51-13997 6/1976 Japan.

Primary Examiner—Leo P. Picard
Assistant Examiner—B. Lee Ledynh
Attorney, Agent, or Firm—Oblon, Spivak, McClelland, Maier & Neustadt

[57] ABSTRACT

A ferrite composition comprising ferrite, borosilicate glass, and optionally boron oxide can be fired at a relatively low temperature of up to 950° C. into a sintered body having improved mechanical strength and electromagnetic properties. The sintered ferrite body is used to form a chip inductor. The inductor is combined with a capacitor to form a composite LC part.

18 Claims, 1 Drawing Sheet

SINTERED FERRITE BODY, CHIP INDUCTOR, AND COMPOSITE LC PART

This is a division of application Ser. No. 07/213,225, filed on Jun. 29, 1988, now U.S. Pat. No. 4,956,114.

BACKGROUND OF THE INVENTION

1. Field of the Invention

This invention relates to a sintered ferrite body useful as various magnetic materials, a chip inductor using the sintered body as a magnetic material, and a composite LC part having capacitor and inductor sections in a common chip.

2. Prior Art

A variety of ferrites have been used as various magnetic cores because of their magnetic properties. Among others, nickel base ferrites including Ni ferrites, Ni-Zn ferrites, and Ni-Cu-Zn ferrites have been widely used as low-temperature sinterable material to which printing and green sheet techniques are applicable.

Sintered ferrite bodies, however, have unsatisfactory mechanical strength. The sintering temperature must be raised to increase the density of a sintered body before the mechanical strength can be enhanced. This undesirably invites an increase of manufacturing expense.

Japanese Patent Application Kokai Nos. 58-135133, 58-135606, 58-135607, 58-135608 and 58-135609 disclose to add glass to ferrite to reduce shrinkage upon sintering, but the specific composition of glass is not disclosed therein. These sintered bodies are insufficient in density, mechanical strength, and high-frequency properties. These drawbacks are assumed to be caused by non-use of the borosilicate glass which is used in the present invention as described later.

Japanese Patent Application Kokai No 51-151331 and U.S. Pat. No. 4,540,500 disclose ferrite having up to 5% by weight of lithium borosilicate glass added thereto. The excellent effects of the present invention will not be attained in the ferrite body because of a less amount of glass.

Japanese Patent Application Kokai No. 59-90915 discloses to form a glass intermediate layer between a conductive layer and an insulating layer. Such a construction will cause Q value drop and insufficient control of coefficient of linear expansion in forming a chip inductor.

Chip inductors and composite LC parts having inductor and capacitor sections in a common chip are known as typical parts in which ferrite finds application. Chip inductors are usually prepared by forming a paste of ferrite and applying the ferrite paste by printing or green sheet technique to form a laminate having an internal conductor embedded therein, followed by sintering. They also suffer from the problems that mechanical strength is low and the sintering temperature must be raised to increase mechanical strength These inductors have unsatisfactory frequency response of inductance and Q value. For example, their inductance and Q value approach substantially zero at a high frequency region in excess of 200 kHz. Frequency response may be improved by using a non-magnetic ceramic in an inductor section to form a coreless coil. The resulting inductor, however, has an insufficient inductance and Q value.

Composite LC parts having inductor and capacitor sections in a common chip suffer from problems that separation or warpage occurs at the LC interface during sintering because of the difference of shrinkage between the ferrite of the inductor section and the dielectric material of the capacitor section and a crack occurs because of the difference of coefficient of linear expansion, failing to fulfil the function as a surface packaged part.

Sintered ferrite bodies find other applications as various magnetic cores, magnetic shields, electromagnetic radiation shields, and attenuators. In these applications, it is also desired to improve sintering temperature, sintered density, and mechanical strength as well as frequency response of electromagnetic properties such as magnetic permeability loss.

SUMMARY OF THE INVENTION

An object of the present invention is to provide a ferrite composition which can be fired at a lower temperature into a sintered body having higher mechanical strength and improved high frequency properties as compared with conventional ones.

Another object of the present invention is to provide such a sintered ferrite body.

A further object of the present invention is to provide a chip inductor of a laminate structure having a ceramic magnetic layer of the sintered ferrite composition and an internal conductor layer.

A still further object of the present invention is to provide a composite LC part having inductor and capacitor sections in a common chip which undergoes neither separation or warpage at the LC interface during simultaneous sintering.

According to a first aspect of the present invention, there is provided a sintered ferrite body comprising a ferrite and a borosilicate glass. The borosilicate glass comprises about 15 to about 75% by weight based on the weight of the body. The ferrite body may further contain boron oxide.

According to a second aspect of the present invention, there is provided a chip inductor comprising at least one ceramic magnetic layer and at least one internal conductor layer placed one on the other, the ceramic magnetic layer containing a ferrite and a borosilicate glass, and the borosilicate glass comprises about 15 to about 75% by weight based on the weight of the body. The ceramic magnetic layer may further contain boron oxide.

According to a third aspect of the present invention, there is provided a ceramic composite LC part comprising a capacitor section including a ceramic dielectric layer and an electrode layer placed one on the other, and an inductor section including a ferrite magnetic layer and an internal conductor layer placed one on the other. The capacitor section is integrated with the inductor section. The ceramic magnetic layer contains a ferrite and a borosilicate glass, and the borosilicate glass comprises about 15 to about 75 % by weight based on the weight of the ceramic magnetic layer, and a ceramic composite LC part may further contain boron oxide.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
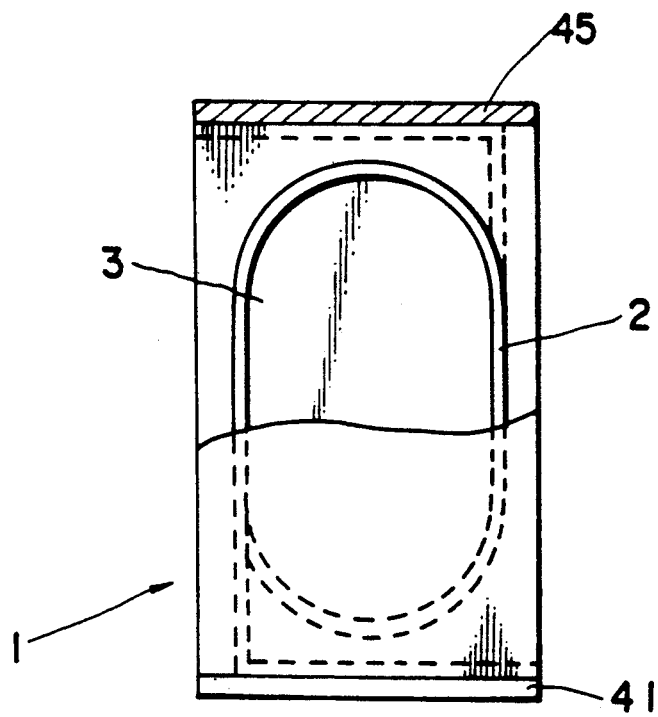
FIG. 1 is a partially cut-away schematic illustration of a chip inductor according to one embodiment of the present invention.

The present invention provides a sintered ferrite body comprising a ferrite and a borosilicate glass. The ferrite body may preferably contain boron oxide. A composition of ferrite and borosilicate glass can be sintered at relatively low temperatures of up to 950° C., especially up to 900° C. Even at such low temperatures, the composition can be sintered to a sufficiently high density to provide mechanical strength The ferrite used herein encompasses all soft ferrites having well-known spinel structure although ferrites containing at least one member selected from Ni, Cu, Mn, Zn, and Fe are preferred. Nickel base ferrites are preferred because they are useful for high-frequency applications and can be sintered at relatively low temperatures. Included are Ni-ferrite, Ni-Cu ferrite, Ni-Zn ferrite, Ni-Cu-Zn ferrite, and similar ferrites having Li added thereto. In nickel base ferrites, the content of Ni preferably ranges from about 45 to about 55 mol% calculated as NiO. Part of the nickel may be replaced by up to 40 mol% of Cu, Zn or Li or a mixture thereof. The nickel base ferrites may contain up to about 5% by weight of Co or Mn, and further up to 1% by weight of Ca, Si, Bi, V or Pb or a mixture thereof.

The composition of the present invention is preferably obtained by blending ferrite with about 15 to 75% by weight, more preferably about 25 to about 35% by weight of borosilicate glass. There is some possibility that less than about 15% by weight of borosilicate glass added is too small to be effective. More than about 75% by weight of borosilicate glass means a too much content of glass ingredient. Such a glass rich composition tends to adhere to a support and largely changes its shape during firing, and has a high degree of deformation and a low magnetic permeability.

The borosilicate glass used herein includes ordinary borosilicate glass, alumina borosilicate glass, alkali borosilicate glass, and other borosilicate glasses With the use of borosilicate glass, the sintered ferrite body of the present invention has high mechanical strength, and improved electromagnetic properties at high frequencies including a low loss and a high Q value. These results are obtained only with the use of borosilicate glass, and not available with lead glass or high silicate glass.

The borosilicate glass used herein may preferably contain about 65 to about 90% by weight of silicon oxide, typically $SiO_2$ and about 8 to about 30% by weight of boron oxide, typically $B_2O_3$. Preferred borosilicate glass contains about 75 to about 90% by weight, most preferably about 80 to about 84% by weight of silicon oxide and about 8 to about 20% by weight, most preferably about 14 to about 18% by weight of boron oxide. Borosilicate glass compositions containing an excess amount of silicon oxide and a less amount of boron oxide have a too low coefficient of linear expansion and poor sinterability, resulting in a sintered body with a low density. Conversely, Borosilicate glass compositions containing a less amount of silicon oxide and an excess amount of boron oxide have a too high coefficient of linear expansion. There is a risk of bubbling upon firing so that the sintered body may have a low density and have changed its size from the original. It also has a high resistivity and a low Q value. The borosilicate glass having the above-mentioned composition has another advantage that it little affects the internal conductor.

The borosilicate glass may contain up to 5% by weight of aluminum oxide, typically $Al_2O_3$, up to 5% by weight of at least one oxide of a monovalent metal M(I) such as K, Na and Li, typically $M(I)_2O$, and up to 5% by weight of at least one oxide of a divalent metal M(II) such as Ba, Ca, Sr, and Zr, typically M(II)O.

In the other embodiment, the sintered ferrite body further contains boron oxide. More particularly, the sintered ferrite body contains up to about 10% by weight, more preferably about 0.1 to about 10% by weight, most preferably about 0.5 to about 10% by weight of boron oxide. The addition of boron oxide improves the sinterability and mechanical strength of the composition. Compositions containing more than about 10% by weight of boron oxide are less resistant to moisture, and thus less durable during storage. It is to be noted that boron oxide is present in borosilicate glass separate from ferrite grains in the calcination step.

The sintered ferrite body of the present invention is generally prepared by any conventional known processes. More particularly, a sintered ferrite body comprising Ni-Cu-Zn ferrite, for example, is prepared by wet blending a predetermined amount of ferrite-forming powder such as a mixture of NiO, CuO, ZnO and $Fe_2O_3$, and a predetermined amount of borosilicate glass powder in a ball mill. The powders used have a particle size of about 0.1 to about 10 μm. The wet mixture is dried usually by a spray dryer, and then calcined. The product is wet ground in a ball mill to a particle size of about 0.01 to about 0.5 μm, dried by a spray dryer, and fired by any of well-known methods.

In the other embodiment, boron oxide powder is added to the last-obtained ferrite/borosilicate glass mixture, along with a binder and a solvent if desired, before the resulting mixture is fired by any of well-known methods. The boron oxide powder used herein may have a particle size of about 0.1 to about 10 μm.

It is also possible to form a paste from necessary powders before it is sintered. A sintered body may be obtained by adding a binder such as ethyl cellulose and a solvent such as terpineol and butyl carbitol (diethylene glycol mono-n-buthyl ether) to a ferrite/borosilicate mixture and optionally, boron oxide powder to form a paste. The paste is formed into a suitable shape or applied as a sheet by a printing or green sheet technique, and sintered at a temperature of up to 950° C., for example, between 850° C. and 930° C. for about ½ to about 4 hours.

Conventional ferrite compositions which are free of borosilicate glass or boron oxide must be sintered at a temperature of about 1,100° C. before a sufficient density can be accomplished. In contrast, a composition comprising ferrite in admixture with 30% by weight of borosilicate glass according to the present invention may be fired at a lower temperature of 950° C. to an equivalent relative sintered density.

A composition of ferrite and borosilicate glass further containing up to 10% by weight of boron oxide according to the present invention may be fired at a further lower temperature of 850° to 950° C. to a higher density with an additional advantage of a higher deflective strength.

In the above embodiment, a mixture of spinel ferrite and glass is obtained by adding boron oxide powder to a mixture of ferrite-forming powders and borosilicate glass powder, forming a paste from the mixture, and firing the paste. Ferrite-forming powders, borosilicate glass powder, and boron oxide powder may be mixed at the same time to form a paste therefrom.

The sintered ferrite body resulting from sintering at lower temperatures has improved electromagnetic properties, especially their frequency response and improved mechanical strength so that it may be used as cores of various electronic parts, magnetic insulators for chip inductors, magnetic or electromagnetic shields, attenuators, or the like. The sintered ferrite body may be readily machined. In the application as shields, the sintered ferrite body may be used as such or the body may be finely divided and mixed with a binder before a shielding part is molded therefrom.

FIG. 1 shows one example of a chip inductor according to the present invention. The chip inductor designated at 1 has a conventional well-known structure as shown in FIG. 1. This inductor may be prepared by a conventional method as by placing internal conductor layers 2 and ferrite magnetic layers 3 one on the other to form a ferrite magnetic laminate having an internal conductor of a predetermined pattern such as a spiral pattern and predetermined turns embedded therein, and connecting opposite ends of the internal conductor 2 to external electrodes 41 and 45.

The paste for forming the ferrite magnetic layers 3 of the chip inductor 1 may be prepared by the same method as used for the paste for forming sintered ferrite bodies. The internal conductor-forming paste is well known and include Ag and Ag-Pd pastes, for example.

A chip inductor may be prepared by alternately applying the ferrite magnetic layer-forming paste and the internal conductor-forming paste onto a substrate of polyethylene terephthalate, for example, by a printing or green sheet technique so as to define a predetermined pattern and firing at a temperature of up to about 950° C., preferably from 850° C. to about 930° C. for about ½ to about 4 hours.

The chip inductor thus prepared has high mechanical strength because the ferrite magnetic layers contain borosilicate glass and optionally, boron oxide so that they are sintered to a better extent. The sintering temperature necessary to obtain a sintered product with an equal density may be lower than in the prior art. The chip inductor of the present invention also has improved high-frequency response of electromagnetic properties.

The number of ferrite magnetic layers laminated may be chosen depending on the intended application although one to twenty layers are generally used. The thickness of each ferrite magnetic layer may be chosen depending on the intended application although the layer is generally about 10 to about 30 $\mu$m thick. The internal conductor 2 is generally formed from a metal such as Ag and Ag-Pd and has a thickness of about 10 to about 25 $\mu$m. The external electrodes 41, 45 may be similarly formed from a metal such as Ag and Ag-Pd and has a thickness of about 10 to about 300 $\mu$m.

Figure 2:
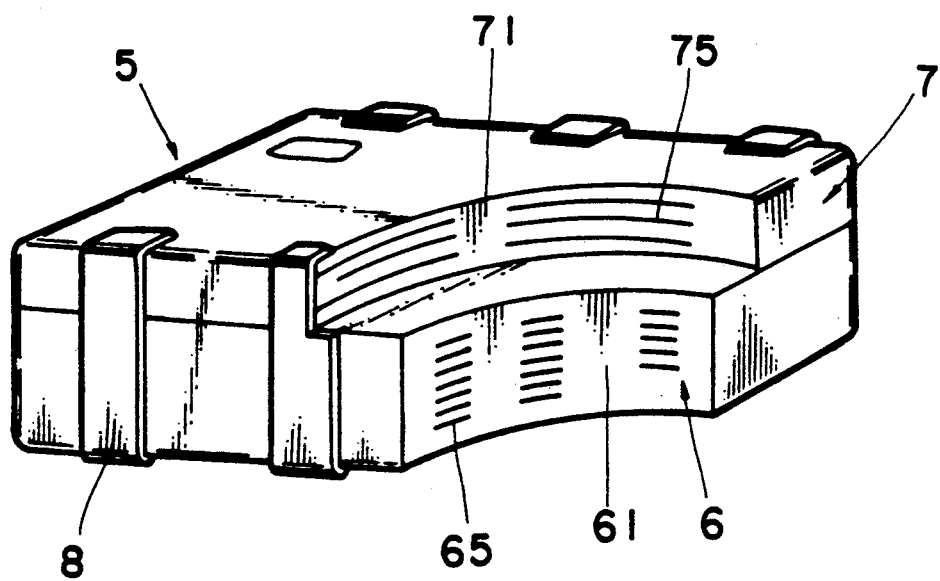
FIG. 2 is a partially cut-away perspective view of a composite LC part according to another embodiment of the present invention.

FIG. 2 shows one example of a composite LC part according to the present invention. The composite LC part designated at 5 has an inductor section 6 and a capacitor section 7 integrated to each other.

The inductor section 6 is prepared by overlying ferrite magnetic layers 61 one on another while interposing internal conductor layers 65 of a predetermined pattern therebetween so as to keep conduction between consecutive conductor segments. The capacitor section 7 which is integrated to the inductor section 6 is prepared by alternately placing internal electrode layers 75 and ceramic dielectric layers 71.

In the example shown in FIG. 2, the inductor and capacitor sections 6 and 7 have a plurality of inductance (L) and capacitance (C), respectively. External electrodes 8 are connected so as to form a desired LC circuit with the inductor and capacitor sections.

The inductor section 6 of the composite LC part 5 has substantially the same structure as the chip inductor shown in FIG. 1. The inductor section can be obtained by sintering at a lower temperature, has improved frequency response and mechanical strength. The percent shrinkage of the ferrite magnetic layer may be controlled by adding a proper amount of borosilicate glass to ferrite so that the shrinkage of the inductor section 6 may be approximately equal to the shrinkage of the capacitor section 7. Then any warpage or separation is avoided at the interface between the inductor and capacitor sections during sintering.

More particularly, nickel base ferrite generally has a coefficient of linear expansion of $90 \times 10^{-7}$ to $115 \times 10^{-7}$/deg. A composition of nickel base ferrite having 17 to 75% by weight of borosilicate glass added thereto has a coefficient of linear expansion reduced to $70 \times 10^{-7}$ to $90 \times 10^{-7}$/deg. The latter value is approximately equal to the coefficient of linear expansion of $75 \times 10^{-7}$ to $85 \times 10^{-7}$/deg. of titanium dioxide base dielectric material used in the dielectric layers of the capacitor section. The composition of nickel base ferrite and borosilicate glass has a shrinkage of about 15 to about 20%, which is approximately equal to the shrinkage of about 15 to about 18% of titanium dioxide base dielectric material.

As mentioned above, according to the present invention, a coefficiient of linear expansion and a shrinkage can be controlled to the desired value by adding the borosilicate glass.

When the ferrite magnetic layers of the inductor section 6 contain up to 10% by weight of boron oxide, the inductor section has a higher density at the end of sintering. Thus, the composite LC part has higher mechanical strength.

The material of which the dielectric layers 71 of the capacitor section 7 are made may be any desired dielectric material, but preferably titanium dioxide base dielectric material. The titanium dioxide base dielectric material used herein contains a major proportion of $TiO_2$ and may contain up to 10 mol% in total of NiO, CuO, $Mn_3O_4$, $Al_2O_3$, MgO or $SiO_2$ or a mixture thereof when a dielectric loss and a coefficient of linear expansion are taken into account. Titanium dioxide base dielectric material has a shrinkage of about 15 to about 18%. The ferrite composition having borosilicate glass added thereto has a similar shrinkage as described above.

The number of dielectric layers in the capacitor section 7 may be chosen depending on the intended application although one to ten layers are generally used. The thickness of each dielectric layer is generally about 50 to about 150 $\mu$m thick. The capacitor section is generally formed from a metal such as Ag and Ag-Pd and has a thickness of about 5 to about 15 $\mu$m.

The number of ferrite magnetic layers laminated in the inductor section 6 may be chosen depending on the intended application although one to twenty layers are generally used. The thickness of each ferrite magnetic layer may be chosen depending on the intended application although the layer is generally about 10 to about 30 μm thick. The internal conductor is generally formed from a metal such as Ag and Ag-Pd and has a thickness of about 10 to about 30 μm.

The external electrode is generally formed from a metal such as Ag and Ag-Pd and has a thickness of about 10 to about 300 μm.

The composite LC part of the present invention may be prepared by any of conventional well-known printing and green sheet techniques. More particularly, pastes for ceramic magnetic layers, dielectric layers, internal electrodes and conductors are prepared and applied one by one onto a substrate of polyethylene terephthalate by a printing or green sheet technique.

Those pastes for forming dielectric layers and internal electrode layers of the capacitor section, internal conductor layers of the inductor section, and external electrodes may be prepared using suitable binder and solvent. The capacitor and inductor sections are prepared by applying the necessary pastes onto a substrate in laminate form by a printing or green sheet technique. The laminate is cut to a predetermined shape, separated from the substrate, and fired at a temperature of up to 950° C., for example 850° to 930° C. The firing time is from about ½ to about 4 hours. At the end of firing, silver paste is baked to the laminate to form external electrodes.

The dimensions of the composite LC part thus prepared may be chosen depending on the intended application.

The sintered ferrite body of the present invention contains borosilicate glass in admixture with ferrite. A composition of ferrite and borosilicate glass can be fired even at a lower temperature of up to 950° C. into a sintered body having a high density and mechanical strength. The sintered body has improved machinability and electromagnetic properties in a high frequency band.

The chip inductor uses the sintered ferrite body as its magnetic layer so that it can be fired at a relatively low temperature into a product having high mechanical strength and improved electromagnetic properties in a high frequency band.

The composite LC part uses the chip inductor as its inductor section so that it can be fired at a relatively low temperature into a product having high mechanical strength and improved electromagnetic properties in a high frequency band. The percent shrinkage of the inductor section may be equalized to that of the capacitor section by adding a controlled amount of borosilicate glass to ferrite. Then occurrence of warpage or separation at the interface of the inductor and capacitor sections due to the difference therebetween of shrinkage upon sintering can be avoided. Difficulty of surface packaging due to warpage or separation is left no longer.

EXAMPLES

In order that those skilled in the art will better understand the practice of the present invention, examples of the present invention are given below by way of illustration and not by way of limitation.

EXAMPLE 1

A sintered ferrite body was prepared by formulating a paste therefor by blending nickel base ferrite-forming powder with borosilicate glass and optionally, boron oxide $B_2O_3$. The Ni base ferrite-forming powder used was a powder mixture of NiO and $Fe_2O_3$ having a particle size of about 0.1 to 1.0 μm. The mixture consisted of 52 mol% of nickel powder calculated as NiO and 48 mol% of iron powder calculated as $Fe_2O_3$. The borosilicate glass used was a borosilicate glass powder, designated Glass I, consisting of 80.3% by weight of $SiO_2$, 17.5% by weight of $B_2O_3$, and 2.2% by weight of $K_2O$ and having a particle size of 5 μm. The blend of Ni base ferrite-forming powder and borosilicate glass powder was wet milled in a ball mill.

The wet mixture was dried by a spray dryer, calcined into granules at 850° C., again ground in a ball mill, dried by a spray dryer into particles having an average particle size of 0.1 μm.

The resulting powder alone or in admixture with boron oxide ($B_2O_3$) powder having an average particle size of 5.0 μm was dispersed in terpineol along with a predetermined amount of ethyl cellulose, and mixed in a Henschel mixer to obtain a paste from which a sintered ferrite body is to be formed.

The paste was applied on a polyethylene terephthalate substrate by a printing technique. The laminate was separated from the substrate and fired at 900° C. for 2 hours, obtaining a bar-shaped sample of $3.0 \times 3.0 \times 15.00$ mm.

The sample was measured for relative sintered density (sintered density/theoretical density), coefficient of linear expansion, and shrinkage, which are reported in Table 1. Sample No. 1 is a sample obtained from the nickel base ferrite-forming powder without blending glass ingredient.

Table 1 also shows the results of other samples using the following glass compositions.

Glass II: high silicate glass
  95% by weight of $SiO_2$
  5% by weight of $Na_2O$
Glass III: lead glass
  42% by weight of $SiO_2$
  52% by weight of PbO
  5.5% by weight of $Al_2O_3$
  0.5% by weight of $B_2O_3$
Glass IV: borosilicate glass
  70% by weight of $SiO_2$
  25% by weight of $B_2O_3$
  5% by weight of $Na_2O$ Glasses II and III are outside the scope of the present invention. Sample No. 10 is a prior art ferrite composition consisting of 45.5 mol% of $Fe_2O_3$, 44 mol% of NiO, 8 mol% of CuO, 2 mol% of ZnO, and 0.6 mol% of CoO.

TABLE 1

| Sample No. | Glass Type | Glass Content (wt %) | $B_2O_3$ (wt %) | Relative sintered density (%) | Shrinkage (%) |
| --- | --- | --- | --- | --- | --- |
| 1* | — | — | — | 92 | 16.0 |
| 2 | Glass I | 28 | — | 97 | 16.5 |
| 3 | Glass I | 42 | — | 97.5 | 19.5 |
| 4 | Glass I | 28 | 2 | 98 | 20.0 |
| 5 | Glass I | 28 | 8 | 98.5 | 21.5 |
| 6 | Glass I | 28 | 15 | 98.8 | 22.2 |
| 7* | Glass II | 30 | — | 72 | 1.6 |
| 8* | Glass III | 30 | — | 95 | 16.0 |
| 9 | Glass IV | 30 | — | 96 | 23.2 |
| 10* | — | — | — | 75 | 6.3 |

*comparison

As seen from Table 1, sample Nos. 2 to 6 and 9 falling within the scope of the present invention could be fired at a relatively low temperature into a sintered body having a high density and mechanical strength. Their shrinkage was as high as 16.5 to 23.2%.

These shrinkage values are approximately equal to the shrinkage of $TiO_2$ base dielectric material which ranges from 15 to 18%. This indicates that when the ferrite composition of the present invention is used to form an inductor section, there will be obtained a composite LC part which is free of warpage, separation or crack. This will be later demonstrated in Example 3.

Sample Nos. 2 and 10 were fired at different temperatures ranging from 800° C. to 950° C. and measured for relative sintered density. The results are shown in Table 2.

TABLE 2

| Sintering temperature | Relative Sintered Density | |
|---|---|---|
| | Sample No. 2 | Sample No. 10 |
| 800° C. | 90% | 65% |
| 850° C. | 95% | 68% |
| 900° C. | 97% | 75% |
| 950° C. | 98% | 86% |

Cores were formed from the composition of sample Nos. 2 and 8 and measured for a magnetic loss at varying frequency. The magnetic loss of sample No. 8 was at least twice larger than that of sample No. 2 at frequencies of 500 MHz or higher.

EXAMPLE 2

A chip inductor of 3.2mm × 2.5mm × 1.0mm as shown in FIG. 1 was prepared by alternately applying the ferrite paste of sample No. 2, 4, 7, 8, 9 or 10 and silver paste by a laminate printing technique to form an alternate laminate of magnetic layers and internal conductor layers. Each ferrite layer was 40 μm thick. Each conductor layer had a thickness of 20 μm and a width of 300 μm. The conductor layers formed 2½ turns of elliptical coil having a major diameter of 2.5 mm and a minor diameter of 1.3 mm. External electrodes were formed from Ag-Pd paste. Sintering was carried out at a temperature of 870° C. for 2 hours.

The thus obtained chip inductors were measured for Q value and inductance (L) at varying frequency. The results are shown in Table 3.

For comparison purposes, a coreless coil was prepared using as the magnetic layer a non-magnetic material consisting essentially of 46 mol% of $Fe_2O_3$, 44 mol% of ZnO and 10 mol% of CuO and having 1 atom% of each of CoO and MnO added. The results of the coreless coil are also shown in Table 3.

TABLE 3

| Sample No. | Glass | | Frequency (MHz) | | | | |
|---|---|---|---|---|---|---|---|
| | | | 50 | 100 | 200 | 300 | 500 |
| 2 | Glass I | L(nH) | 25 | 30 | 40 | 40 | 40 |
| | | Q | 21 | 28 | 35 | 29 | 20 |
| 4 | Glass I | L(nH) | 26 | 32 | 42 | 41 | 41 |
| | | Q | 22 | 29 | 37 | 30 | 22 |
| 7* | Glass II | L(nH) | 10 | 11 | 11 | 15 | 15 |
| | | Q | 15 | 20 | 20 | 22 | 18 |
| 8* | Glass III | L(nH) | — | — | — | — | — |
| | | Q | — | — | — | — | — |
| 9 | Glass IV | L(nH) | 24 | 26 | 31 | 30 | 30 |
| | | Q | 20 | 25 | 27 | 25 | 20 |
| 10* | — | L(nH) | 105 | 125 | 410 | — | — |
| | | Q | 37 | 37 | 3 | — | — |
| Coreless | — | L(nH) | 10 | 10 | 15 | 20 | 20 |

TABLE 3-continued

| Sample No. | Glass | | Frequency (MHz) | | | | |
|---|---|---|---|---|---|---|---|
| | | | 50 | 100 | 200 | 300 | 500 |
| coil | | Q | 16 | 21 | 21 | 25 | 17 |

As seen from Table 3, the samples of the present invention have superior frequency response of inductance and Q value to the comparative samples. Sample No. 7 containing Glass II, high silicate glass in the magnetic layers had lower strength than the remaining samples. Sample No. 8 containing Glass III, lead glass in the magnetic layers was unmeasurable because lead caused silver in the internal conductor layers to diffuse so that the electrode locally disappeared or was disconnected.

Similar experiments were carried out by replacing the ferrite-forming powder by other various Ni-Zn ferrite-forming powders and replacing the glass material by 30% by weight of other various borosilicate glasses. Similar results were obtained.

Also, similar results were obtained in similar experiments which were carried out with compositions containing Ni-Cu ferrite and 25% by weight of borosilicate glass, Ni-Cu-Zn ferrite and 28% by weight of borosilicate glass, and Ni-Cu-Zn-Li ferrite and 23% by weight of borosilicate glass, % by weight being based on the total weight of each composition.

EXAMPLE 3

A composite LC part comprising inductor and capacitor sections was prepared.

A magnetic layer-forming paste was prepared by adding borosilicate glass to Ni base ferrite-forming powder such that the content of borosilicate glass ranged from 10 to 80% by weight of the mixture. The Ni base ferrite-forming powder used was a powder mixture of NiO, CoO and $Fe_2O_3$ having a particle size of about 0.1 to 1.0 μm. The mixture consisted of 52 mol% of nickel powder calculated as NiO and 48 mol% of iron powder calculated as $Fe_2O_3$, and contained 0.4% by weight of CoO. The borosilicate glass used was a borosilicate glass powder consisting of 82.0% by weight of $SiO_2$, 16.0% by weight of $B_2O_3$, 0.3% by weight of $Al_2O_3$, and 1.7% by weight of $K_2O$ and having an average particle size of 5 μm. The blend of Ni base ferrite-forming powder and borosilicate glass powder was wet milled in a ball mill.

The wet mixture was dried by a spray dryer, calcined into granules at 800° C., again ground in a ball mill, dried by a spray dryer into particles having an average particle size of 0.1 μm.

The resulting powder was dispersed in terpineol along with a predetermined amount of ethyl cellulose, and mixed in a Henschel mixer to obtain a paste from which a ceramic magnetic layer is to be formed for the inductor section.

The paste was applied onto a polyethylene terephthalate substrate by a printing technique. The laminate was separated from the substrate and fired at 870° C. for 2 hours, obtaining a bar-shaped sample of 3.0 × 3.0 × 15.00 mm.

The sample was measured for coefficient of linear expansion, which is reported in Table 4. Table 4 also shows the results of other samples using Glasses II, III and IV whose composition is identified in Example 1.

TABLE 4

| Glass | Content (wt %) | Coefficient of linear expansion ($\times 10^7$/deg) |
|---|---|---|
| none ($NiFe_2O_4$) | 0 | 115 |
| Borosilicate glass | 10 | 104 |
| Borosilicate glass | 20 | 96 |
| Borosilicate glass | 30 | 82 |
| Borosilicate glass | 40 | 74 |
| Borosilicate glass | 50 | 65 |
| Borosilicate glass | 60 | 62 |
| Borosilicate glass | 70 | 48 |
| Borosilicate glass | 80 | 43 |
| Glass II | 25 | 92 |
| Glass III | 40 | 88 |
| Glass IV | 50 | 96 |
| $SiO_2$ | 20 | 85 |
| $TiO_2$ base dielectric | — | 85 |

The shrinkage of these samples was measured, with the results shown in Table 5.

TABLE 5

| Glass | Content (wt %) | Shrinkage (%) |
|---|---|---|
| none ($NiFe_2O_4$) | 0 | 16.5 |
| Borosilicate glass | 30 | 14.5 |
| Glass II | 25 | 8.0 |
| Glass III | 40 | 17.1 |
| Glass IV | 50 | 20.3 |
| $SiO_2$ | 20 | 0.5 |
| $TiO_2$ base dielectric | — | 16.7 |

It is to be noted that the bottom line in Tables 4 and 5 shows corresponding values of $TiO_2$ base dielectric material of which a dielectric layer is formed to constitute the capacitor section.

As seen from Tables 4 and 5, the ferrite compositions containing borosilicate glass according to the present invention can have a coefficient of linear expansion and a shrinkage approximately equal to those of the $TiO_2$ base dielectric layer.

Table 6 shows the initial magnetic permeability ($\mu i$) of some samples at 100 MHz.

TABLE 6

| Glass | Content (wt %) | $\mu i$ |
|---|---|---|
| none ($NiFe_2O_4$) | 0 | 13.1 |
| Borosilicate glass | 30 | 2.5 |

As seen from Table 6, the ferrite/borosilicate glass composition according to the present invention has a reduced initial magnetic permeability, indicating that the frequency response of the magnetic layer on a high frequency side is improved.

Next, another paste from which a dielectric layer is to be formed for the capacitor section was prepared from a powder having a composition consisting of 91% by weight of $TiO_2$, 3% by weight of NiO, 3% by weight of CuO, and 3% by weight of $Mn_3O_4$ and an average particle size of 0.1 to 1.0 μm, using the same binder and solvent as used in the magnetic layer-forming paste.

The magnetic layer-forming paste containing 30% by weight of borosilicate glass (based on the total of ferrite and borosilicate glass), the dielectric layer-forming paste, and Ag paste for forming internal electrode and conductor were applied by a printing technique to form a laminate. The inductor section included 10 magnetic layers each having a thickness of 40 μm. The section included 2 dielectric layers each having a thickness of 100 μm. The internal electrode and conductor each were 20 μm thick.

The laminate was sintered at 870° C. for 2 hours. The laminate was gradually cooled, obtaining a composite LC part of 4.5mm×3.2mm×1.5mm constituting a high-pass filter circuit for 100 MHz and higher band pass.

In the composite LC part, no warpage, separation or cracking was observed at the interface between the capacitor and inductor sections. The internal conductor experienced no deterioration of its properties. A comparative part having a magnetic layer of borosilicate glass-free ferrite in the inductor section had a passband of 100–500 MHz whereas the present part had the upper limit of its passband extended toward higher frequencies by 500 MHz and had a passband of 100 MHz to 1 GHz.

In those samples using Glass II, Glass IV, and $SiO_2$, warpage, separation or cracking occurred. In the sample using Glass III, the internal conductor deteriorated its properties.

A specimen was observed under a microscope for warpage, separation or cracking. For each sample, 100 specimens were tested. The number of deficient specimens per 100 specimens is reported in Table 7.

A specimen was kept at a temperature of 40° C. and a relative humidity of 85–90% for 1,000 hours before the resistance of its internal conductor was measured. For each sample, 100 specimens were tested. The number of those specimens whose resistance changed more than 10% from their initial resistance is reported in Table 7.

TABLE 7

| Glass | Content (wt %) | Deficient specimens* | Resistance changed specimens* |
|---|---|---|---|
| none ($NiFe_2O_4$) | 0 | 87 | 0 |
| Borosilicate glass | 30 | 0 | 0 |
| Glass II | 25 | 56 | 5 |
| Glass III | 42 | 98 | 86 |
| Glass IV | 60 | 62 | 36 |
| $SiO_2$ | 20 | 100 | — |

*per 100 specimens

EXAMPLE 4

A powder mixture of ferrite-forming powder and borosilicate glass powder having the same composition as in Example 3 was prepared by the same procedure as in Example 3.

The resulting powder and boron oxide ($B_2O_3$) powder having an average particle size of 5.0 μm were dispersed in terpineol along with a predetermined amount of ethyl cellulose, and mixed in a Henschel mixer to obtain a paste from which a ceramic magnetic layer is to be formed for the inductor section.

The paste was applied onto a polyethylene terephthalate substrate by a printing technique. The laminate was separated from the substrate and fired at 870° C. for 2 hours, obtaining a bar-shaped sample of 3.0×3.0×15.00 mm.

The sample was measured for coefficient of linear expansion and shrinkage, which are reported in Tables 8 and 9. There are also shown the results of other samples using Glasses II, III and IV whose composition is identified in Example 1.

TABLE 8

| Glass | Glass content (wt %) | $B_2O_3$ Content (wt %) | Coefficient of linear expansion ($\times 10^{-7}$/deg) |
|---|---|---|---|
| none ($NiFe_2O_4$) | 0 | — | 115 |
| Borosilicate glass | 10 | 2 | 105 |

TABLE 8-continued

| Glass | Glass content (wt %) | $B_2O_3$ Content (wt %) | Coefficient of linear expansion ($\times 10^{-7}$/deg) |
|---|---|---|---|
| Borosilicate glass | 20 | 2 | 95 |
| Borosilicate glass | 30 | 2 | 85 |
| Borosilicate glass | 40 | 2 | 75 |
| Borosilicate glass | 50 | 2 | 67 |
| Borosilicate glass | 60 | 2 | 63 |
| Borosilicate glass | 70 | 2 | 50 |
| Borosilicate glass | 80 | 2 | 45 |
| Glass II | 25 | — | 92 |
| Glass III | 40 | — | 88 |
| Glass IV | 50 | — | 96 |
| $SiO_2$ | 20 | — | 85 |
| $TiO_2$ base dielectric | 0 | — | 85 |

TABLE 9

| Glass | Glass Content (wt %) | $B_2O_3$ Content (wt %) | Shrinkage (%) |
|---|---|---|---|
| none ($NiFe_2O_4$) | 0 | — | 16.5 |
| Borosilicate glass | 30 | 2 | 16.8 |
| Glass II | 25 | — | 8.0 |
| Glass III | 40 | — | 17.1 |
| Glass IV | 50 | — | 20.3 |
| $SiO_2$ | 20 | — | 0.5 |
| $TiO_2$ base dielectric | 0 | — | 16.7 |

It is to be noted that the bottom line in Tables 8 and 9 shows corresponding values of $TiO_2$ base dielectric material of which a dielectric layer is formed to constitute the capacitor section.

As seen from Tables 8 and 9, the ferrite compositions containing borosilicate glass according to the present invention can have a coefficient of linear expansion and a shrinkage approximately equal to those of the $TiO_2$ base dielectric layer.

Samples having the same composition as above were prepared while the amount of boron oxide $B_2O_3$ added was varied as shown in Table 10. These samples were measured for deflective strength. The amounts of borosilicate glass and boron oxide added are expressed in % by weight based on the total weight of the composition of ferrite, borosilicate glass and boron oxide.

TABLE 10

| Borosilicate glass (wt %) | $B_2O_3$ (wt %) | Deflective strength (kgf/mm$^2$) |
|---|---|---|
| 0 | 0 | 8.7 |
| 30 | 0 | 3.5 |
| 30 | 0.5 | 6.1 |
| 30 | 1 | 7.5 |
| 30 | 1.5 | 8.9 |
| 30 | 2 | 10.0 |
| 30 | 3 | 10.3 |
| 30 | 4 | 10.0 |
| 30 | 6 | 9.7 |
| 30 | 8 | 8.5 |
| 30 | 10 | 8.0 |
| 30 | 15 | 7.5 |

As seen from Table 10, the addition of boron oxide is effective in increasing mechanical strength. The sintered ferrite composition containing 15% by weight of boron oxide was less resistant to moisture.

Table 11 shows the initial magnetic permeability ($\mu i$) of some samples at 100 MHz.

TABLE 11

| Borosilicate glass (wt %) | $B_2O_3$ (wt %) | $\mu i$ |
|---|---|---|
| 0 | 0 | 13.1 |

TABLE 11-continued

| Borosilicate glass (wt %) | $B_2O_3$ (wt %) | $\mu i$ |
|---|---|---|
| 30 | 2 | 2.5 |

As seen from Table 11, the ferrite/borosilicate glass/boron oxide composition according to the present invention has a reduced initial magnetic permeability, indicating that the frequency response of the magnetic layer on a high frequency side is improved.

A composite LC part was prepared by the same procedure as in Example 3. No warpage, separation or cracking was observed at the interface between the capacitor and inductor sections of the composite LC part. The internal conductor experienced no deterioration of its properties. The present part had the upper limit of its passband extended toward higher frequencies by about 500 MHz as compared with a part having a magnetic layer of borosilicate glass-free ferrite.

In those samples using Glass II, Glass IV, and $SiO_2$, warpage, separation or cracking occurred. In the sample using Glass III, the internal conductor deteriorated its properties.

A specimen was observed under a microscope for warpage, separation or cracking. For each sample, 100 specimens were tested. The number of deficient specimens per 100 specimens is reported in Table 12.

A specimen was kept at a temperature of 40° C. and a relative humidity of 85-90% for 1,000 hours before the resistance of its internal conductor was measured. For each sample, 100 specimens were tested. The number of those specimens whose resistance changed more than 10% from their initial resistance is reported in Table 12.

TABLE 12

| Type | Glass Content (wt %) | $B_2O_3$ (wt %) | Deficient specimens* | Resistance changed specimens* |
|---|---|---|---|---|
| none | 0 | 0 | 87 | 0 |
| Borosilicate glass | 30 | 0 | 0 | 0 |
| Borosilicate glass | 30 | 2 | 0 | 0 |
| Borosilicate glass | 30 | 4 | 0 | 0 |
| Borosilicate glass | 30 | 15 | 0 | 2 |
| Glass II | 25 | — | 56 | 5 |
| Glass III | 42 | — | 98 | 86 |
| Glass IV | 60 | — | 62 | 36 |
| $SiO_2$ | 20 | — | 100 | — |

*per 100 specimens

Obviously, numerous modifications and variations of the present invention are possible in light of the above teachings. It is therefore to be understood that within the scope of the appended claims, the invention may be practiced otherwise than as specifically described herein.

We claim:

1. A chip inductor comprising at least one ceramic magnetic layer and at least one internal conductor layer placed one on the other, said ceramic magnetic layer containing a ferrite and a borosilicate glass, wherein said borosilicate glass comprises about 25 to about 35% by weight based on the weight of the ceramic magnetic layer.

2. The chip inductor of claim 1 wherein said borosilicate glass contains about 75 to about 90% by weight of silicon oxide and about 8 to about 20% by weight of boron oxide based on the weight of the borosilicate glass.

3. The chip inductor of claim 1 wherein the ferrite is a nickel based ferrite.

4. A chip inductor comprising at least one ceramic magnetic layer and at least one internal conductor layer placed one on the other, said ceramic magnetic layer containing a ferrite, a borosilicate glass, and boron oxide, wherein said borosilicate glass comprises about 25 to about 35% by weight based on the weight of the ceramic magnetic layer.

5. The chip inductor of claim 4 wherein said ceramic magnetic layer contains up to about 10% by weight of boron oxide based on the weight of the ceramic magnetic layer.

6. The chip inductor of any one of claims 4 wherein said borosilicate glass contains about 75 to about 90% by weight of silicon oxide and about 8 to about 20% by weight of boron oxide based on the weight of the borosilicate glass.

7. The chip inductor of claim 4 wherein the ferrite is a nickel based ferrite.

8. A composite LC part comprising
a capacitor section including a ceramic dielectric layer and an electrode layer placed one on the other, and
an inductor section including a ferrite magnetic layer and an internal conductor layer placed one on the other, said capacitor section being integrated with said inductor section,
said ceramic magnetic layer containing a ferrite and a borosilicate glass, wherein said borosilicate glass comprises about 25 to about 35% by weight based on the weight of the ceramic magnetic layer.

9. The composite LC part of claim 8 wherein said borosilicate glass contains about 75 to about 90% by weight of silicon oxide and about 8 to about 20% by weight of boron oxide based on the weight of the borosilicate glass.

10. The composite LC part of claim 8 wherein the ferrite is a nickel based ferrite.

11. The composite LC part of claim 8 wherein said dielectric layer is based on $TiO_2$.

12. The composite LC part of claim 8 wherein said capacitor section and said inductor section are integrated by simultaneous sintering.

13. A composite LC part comprising:
a capacitor section including a ceramic dielectric layer and an electrode layer placed on the other, and
an inductor section including a ferrite magnetic layer and an internal conductor layer placed one on the other, said capacitor section being integrated with said inductor section,
said ceramic magnetic layer containing a ferrite, a borosilicate glass, and boron oxide, wherein said borosilicate glass comprises about 25 to about 35% by weight based on the weight of the ceramic magnetic layer.

14. The composite LC part of claim 13 wherein said ceramic magnetic layer contains up to about 10% by weight of boron oxide based on the weight of the ceramic magnetic layer.

15. The composite LC part of claim 13 or 14 wherein said borosilicate glass contains about 75 to about 90% by weight of silicon oxide and about 8 to about 20% by weight of boron oxide based on the weight of the borosilicate glass.

16. The composite LC part of claim 13 wherein the ferrite is a nickel based ferrite.

17. The composite LC part of claim 13 wherein said dielectric layer is based on $TiO_2$.

18. The composite LC part of claim 13 wherein said capacitor section and said inductor section are integrated by simultaneous sintering.

* * * * *